Figure 1:
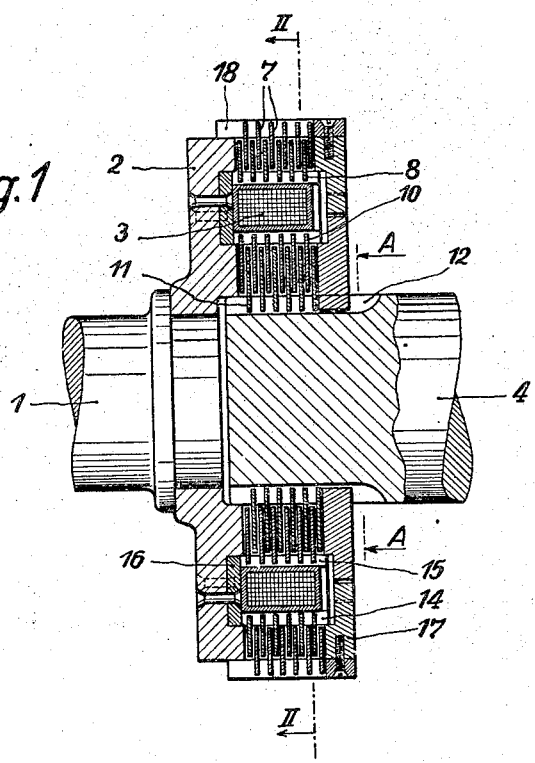

Dec. 22, 1942.  F. KEMMLER ET AL  2,305,788
ELECTROMAGNETIC FRICTION DISK CLUTCH
Filed Aug. 8, 1939

Inventors:
Fritz Kemmler
Hermann Seidl
Josef Unger
by S. Sokal,
Attorney

Patented Dec. 22, 1942

2,305,788

UNITED STATES PATENT OFFICE 2,305,788

ELECTROMAGNETIC FRICTION DISK CLUTCH

Fritz Kemmler and Hermann Seidl, Friedrichshafen, and Josef Unger, Ravensburg-Weingarten, Germany; vested in the Alien Property Custodian Application August 8, 1939, Serial No. 288,984
In Germany September 1, 1938

11 Claims. (Cl. 192—84)

This invention relates to an improved electromagnetic friction plate or disk clutch for the transmission of torque.

According to the invention, the annular magnet coil, or set of magnet coils, is arranged between two separate plate or disk packs, that is to say between an inner and an outer annular pack, so that the magnet coil magnetises both plate or disk packs, the plate or disk carriers of one clutch part having a sliding fit in the other clutch part. Moreover, the armature disk advantageously consists of two annular interengaging parts, which are axially relatively displaceable and serve for compressing the two plate packs independently of one another.

Electromagnetic multi-disk or plate clutches with an annular magnet coil and a disk or plate pack arranged concentrically have already been proposed. They, however, have the disadvantage of too small a magnetic force flux so that, in order to attain an in any way effective result, a relatively high consumption of electrical force is necessary, if the friction disks or plates are to engage properly with one another.

Compared with the clutches heretofore proposed, the novel construction according to the invention, with two separate annular plate packs and intermediate annular magnet coil set, produces an essentially increased coupling effect. At once, additional pathways are obtained for the magnetic lines of force so that only a minimum number of ampere turns or consumption of electrical power is necessary. In this way the magnet coil set can be given smaller dimensions than hitherto.

The two plate packs, which are independent of one another, make it possible to compensate in a favourable manner for the unavoidable inaccuracies in manufacture and any non-uniform wear of the individual plates.

The above described advantages of the clutch construction, in accordance with the invention, are particularly valuable for electro-magnetic clutches having a large number of very thin plates or disks, such as are employed in clutches with a plate pack and magnet coil arranged axially behind one another. In the clutch construction in accordance with this invention, the magnet coil is arranged at the position of the annular space present in a pack formed of perforated plates or disks so that now two separate plate packs are provided. As the webs present, in the case of perforated plates, between the perforations are omitted, any undesirable overflow of magnet lines of force radially from the outside towards the inside and vice versa is stopped. Consequently the so-called leakage, which, with an increasing number of plates or disks, produces a gradual diminishing of the force of the attraction, is entirely absent.

The specific force of attraction remains equal, therefore, in all the plates and consequently, the moment, transmissible by the whole plate pack, is increased compared with the former constructions. In the new construction of clutch, in which, instead of one pack of perforated plates, two separate plate packs are provided, the plates are elastic and flexible so that, when the packs are compressed, the air space still remaining between the individual plates has practically disappeared and thereby an increased conductivity is obtained for the magnetic force flux. As a result of this an increased turning moment is produced by a higher specific pressure.

Figure 2:
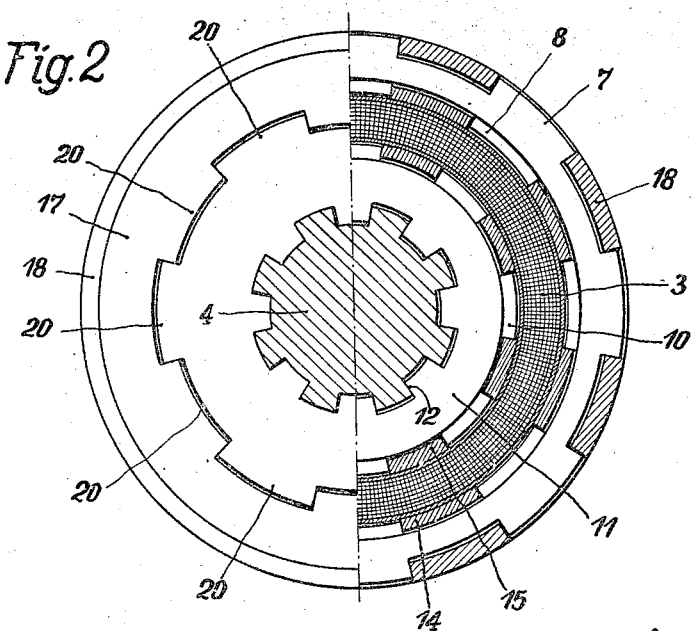

In order that the invention may be fully understood, I shall now describe one embodiment thereof, by way of example, by reference to the accompanying drawing, in which:

Figure 1 is a vertical longitudinal section of a friction plate or disk clutch constructed in accordance with this invention, and Figure 2 is a partial end elevation looking in the direction of the arrow A of Figure 1 and a partial section on the line II—II thereof.

The clutch is intended for the coupling of two shafts, the carrier of the magnet coil or coils being connected to one shaft, whilst the armature disk, connected to the plates, is keyed on the other shaft.

On the shaft 1 is arranged the coil carrier member 2 with the magnet coil 3. Outside and inside the coil are arranged the plates, of which the outer pack consists of the plates 7 carried or guided at the outer periphery thereof and the plates 8 guided at the inner periphery thereof whilst the inner plate pack is formed of the plates 10, guided at the outer periphery thereof and the plates 11 guided at the inner periphery thereof. The other shaft 4 is formed with a grooved portion 12 which serves as a guide for the last-mentioned inner plates 11, and outside and inside the magnet coil 3 are arranged carrier members 14 and 15 of which 14 are the carriers for the inner plates of the outer plate pack and 15 are the carriers for the outer plates of the inner plate pack. The said carriers 14 and 15 are advantageously arranged on a ring 16 which may be formed integrally with the coil carrier member 2. The armature disk 17 consists of two parts connected together by means of interengaging projections or teeth 20 so that the two annular parts of the armature disk 17 can be displaced axially and press on the respective plates independently of one another. In this way, in spite of the unavoidable inaccuracies in the manufacture of the clutch parts and the differing wear of the two plate packs, a constantly uniform pressure is ensured. The outer annular part of the disk 17 is provided with the carriers 18 for the outer plates 7 of the outer plate pack.

The carrier members 14, 15 and 18 are advantageously made from hardened material or are subsequently hardened.

The plates are advantageously so dimensioned that the effective friction surfaces outside and inside the magnet coil are equal.

In accordance with the invention by the reduction of the overall length of the plate clutch, the path of the induction flux is also considerably shortened so that the clutching or coupling effect is increased. Moreover, the invention provides a particular construction in which the ends of the carriers fit slidingly into the opposing magnet disks whereby an uninterrupted magnetic force flux is passed not only in a path through the plates but also in a second path through the magnet disks, outer and inner carriers and the shaft.

We claim:

1. An electro-magnetic plate clutch comprising the sub-combination of: a driving member; a driven member; a first clutch part fixed to said driving member; a second clutch part keyed to said driven member including a pair of interengaging axially slidable members; a pair of spaced inner and outer annular concentric friction plate packs associated with, and located between, said two clutch parts; an energizable annular magnet coil located in the annular space between said inner and outer friction plate packs and energizable to magnetize both said packs simultaneously, and carrier members for certain of the plates of each pack, one of the carrier members being secured to one member of the pair of interengaging axially slidable members, and having a sliding engagement with the first clutch part.

2. An electro-magnetic plate clutch comprising the sub-combination of: a first shaft; a first clutch part carried by said shaft; a second shaft, a second clutch part comprising a plurality of inner and outer electro-magnetically actuated members carried by said second shaft; an energizable annular magnet coil fixedly mounted on said first clutch part; an inner annular friction plate pack located within said annular magnet coil; an outer annular plate pack disposed around the outside of said coil, each of said packs comprising inner and outer friction plates; means carried by said second clutch part for carrying the outer plates of said outer pack and said second shaft having grooves therein for the reception of the inner plates of said inner pack; and a pair of annular carrier members for the outer plates of said inner packs and the inner plates of said outer packs, said members being carried by the first clutch part, and being located respectively between said inner plate pack and said coil and between the latter and said outer plate pack and said carrier members having a sliding engagement with the inner and outer electromagnetically actuated members which are carried by said shaft.

3. An electro-magnetic plate clutch comprising the sub-combination of: a first shaft; a first clutch part carried by said shaft; an energisable annular magnet coil carried by said clutch part; a second shaft having a grooved portion therein; an armature disk keyed on said second shaft, said disk comprising a pair of interengaging but axially relatively slidable parts; an outer annular friction plate pack surrounding said magnet coil and located adjacent one of said armature disk parts; a separate inner annular friction plate pack arranged within said annular magnet coil, said pack being located adjacent said other armature disk part, whereby on energisation of said magnet coil both said plate packs will be magnetised and each of said armature disk parts will act to compress its pertaining plate pack independently of the other part.

4. An electro-magnetic plate clutch comprising a first rotatable member, and a second rotatable member axially aligned with the first rotatable member, an inner annular pack of clutch plates having certain of its plates secured for rotation with the first rotatable member and other plates secured for rotation with the second rotatable member, an outer annular pack of clutch plates located outside of the inner pack having certain of its plates secured for rotation with the first rotatable member and other plates secured for rotation with the second rotatable member, and separate electro-magnetically actuated members capable of relative axial movement for compressing the inner and outer clutch packs.

5. An electro-magnetic plate clutch comprising a first rotatable member, and a second rotatable member axially aligned with the first rotatable member, an inner annular pack of clutch plates having certain of its plates secured for rotation with the first rotatable member and other plates secured for rotation with the second rotatable member, an outer annular pack of clutch plates located outside of the inner pack having certain of its plates secured for rotation with the first rotatable member and other plates secured for rotation with the second rotatable member, inner and outer members capable of relative axial movement for compressing the respective inner and outer clutch packs, and common electromagnetic means for actuating said inner and outer members.

6. An electro-magnetic plate clutch comprising a first rotatable member, and a second rotatable member axially aligned with the first rotatable member, an inner annular pack of clutch plates having certain of its plates secured for rotation with the first rotatable member and other plates secured for rotation with the second rotatable member, an outer annular pack of clutch plates located outside of the inner pack having certain of its plates secured for rotation with the first rotatable member and other plates secured for rotation with the second rotatable member, inner and outer members capable of relative axial movement for compressing the respective inner and outer clutch packs, and electro-magnetic means disposed between the inner and outer clutch packs for simultaneously actuating the inner and outer clutch pack compressing members.

7. An electro-magnetic plate clutch comprising a first rotatable member, and a second rotatable member axially aligned with the first rotatable member, an inner annular pack of clutch plates having certain of its plates secured for rotation with the first rotatable member and other plates secured for rotation with the second rotatable member, an outer annular pack of clutch plates located outside of the inner pack having certain of its plates secured for rotation with the first rotatable member and other plates secured for rotation with the second rotatable member, and separate electro-magnetically actuated members keyed for simultaneous rotation but capable of relative axial movement for compressing the inner and outer clutch packs.

8. An electro-magnetically actuated clutch comprising a first relatively rotatable member and a second rotatable member axially aligned with the first rotatable member, an inner annular pack of clutch plates, an outer pack of clutch plates surrounding the inner pack, separate members for compressing the inner and outer clutch packs capable of axial and rotative movement independently of the first rotatable member, the inner and outer clutch packs each having certain of its plates secured for rotation with the first rotatable member and each having other plates secured for rotation with its own compressing member, the inner and outer compressing members being secured for rotation with the second rotatable member but being capable of axial movement relative both to the second rotatable member and to each other, and electro-magnetic means disposed between the inner and outer clutch packs for actuating the inner and outer clutch pack compressing members.

9. An electro-magnetically actuated clutch comprising a first relatively rotatable member and a second rotatable member axially aligned with the first rotatable member, an inner annular pack of clutch plates, and an outer annular pack of clutch plates surrounding the inner pack, separate members for compressing the inner and outer clutch packs capable of axial and rotative movement independently of the first rotatable member, the inner and outer clutch packs each having certain of its plates secured for rotation with the first rotatable member and each having other plates secured for rotation with its own compressing member, the inner and outer compressing members being capable of independent axial movement relative to each other and relative to the second rotatable member, but said inner and outer compressing members being keyed to each other and being keyed to the second rotatable member so that both said compressing members rotate with the second rotatable member, and electro-magnetic means disposed between the inner and outer clutch packs for actuating the inner and outer clutch pack compressing members.

10. An electro-magnetic plate clutch comprising a first rotatable member, and a pair of second rotatable members axially aligned with the first rotatable member having recessed portions in each member, an inner annular pack of clutch plates, an outer annular pack of clutch plates surrounding said inner pack, both said packs being located between the first and second rotatable members, carrier means for certain of the plates of each of said plate packs, said carrier means being fixed to said first rotatable member and having end portions in telescoping engagement with the recessed portions of said pair of second rotatable members, and electro-magnetic means secured to the first rotatable member for magnetizing said plate packs and the second rotatable member.

11. An electro-magnetic clutch comprising a first rotatable member, a second rotatable member, a multiple plate clutch means having certain plates secured for rotation with the first rotatable member and coacting other plates secured for rotation with the second rotatable member, inner and outer electro-magnetically actuated members capable of relative axial movement located at one end of the clutch means for compressing the clutch means, and electro-magnetic means for actuating the inner and outer compression members.

FRITZ KEMMLER.
HERMANN SEIDL.
JOSEF UNGER.